June 15, 1937.  A. E. F. BILLSTEIN  2,084,274
ELECTRICAL TESTER
Filed Feb. 29, 1932   6 Sheets-Sheet 1
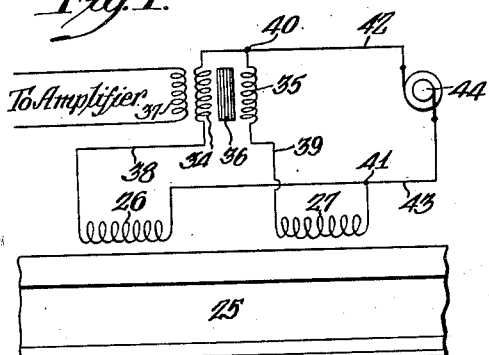
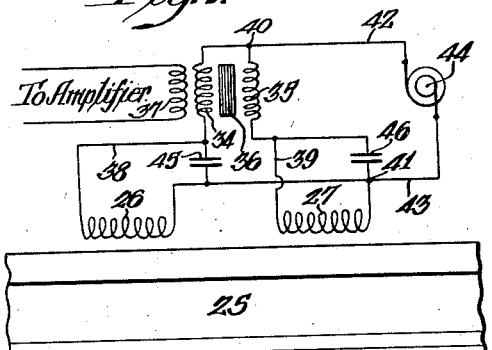
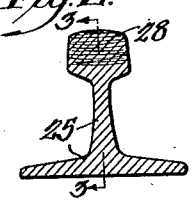
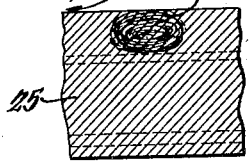
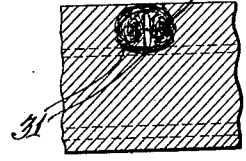
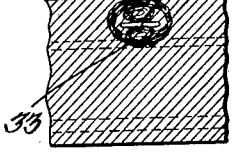
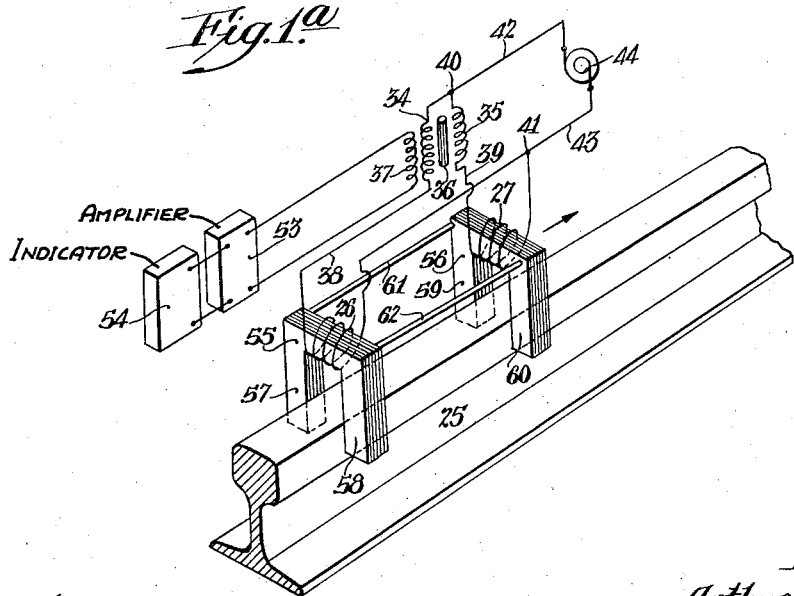
Inventor:
Arthur E. F. Billstein June 15, 1937.    A. E. F. BILLSTEIN    2,084,274
ELECTRICAL TESTER
Filed Feb. 29, 1932    6 Sheets-Sheet 3
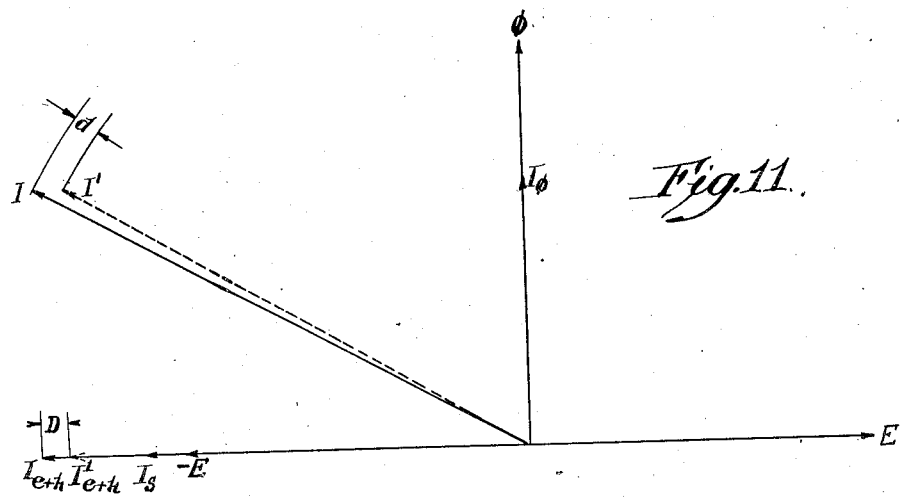
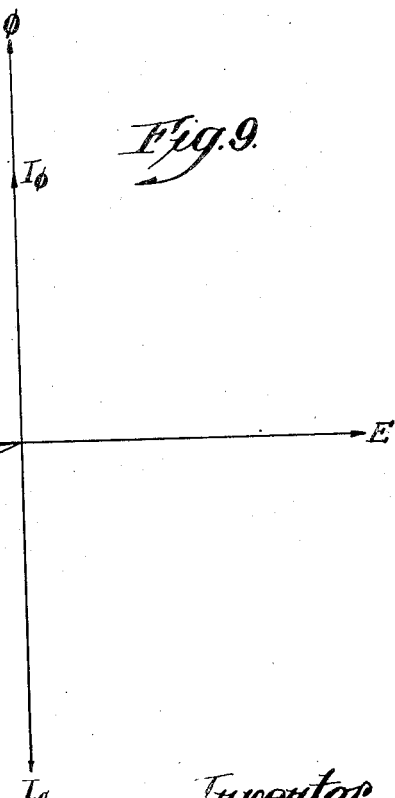

June 15, 1937.  A. E. F. BILLSTEIN  2,084,274
ELECTRICAL TESTER
Filed Feb. 29, 1932  6 Sheets-Sheet 4
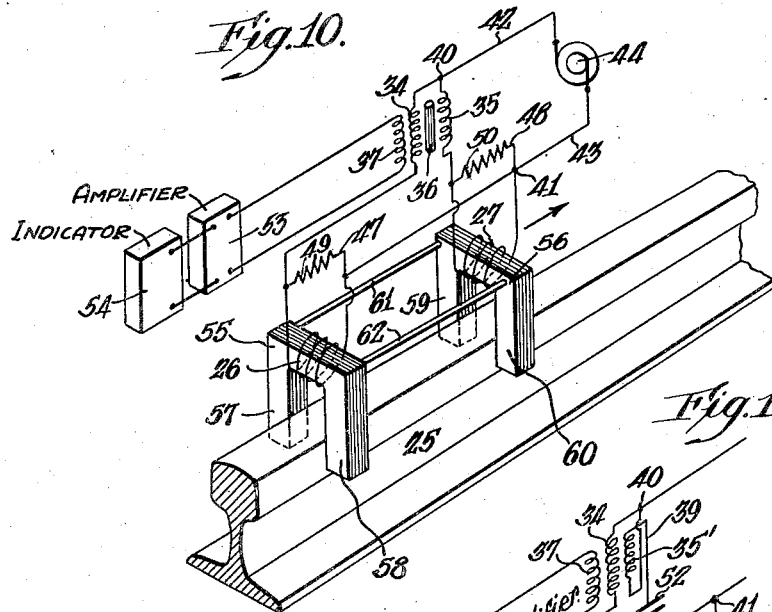

June 15, 1937. A. E. F. BILLSTEIN 2,084,274
ELECTRICAL TESTER
Filed Feb. 29, 1932 6 Sheets-Sheet 5
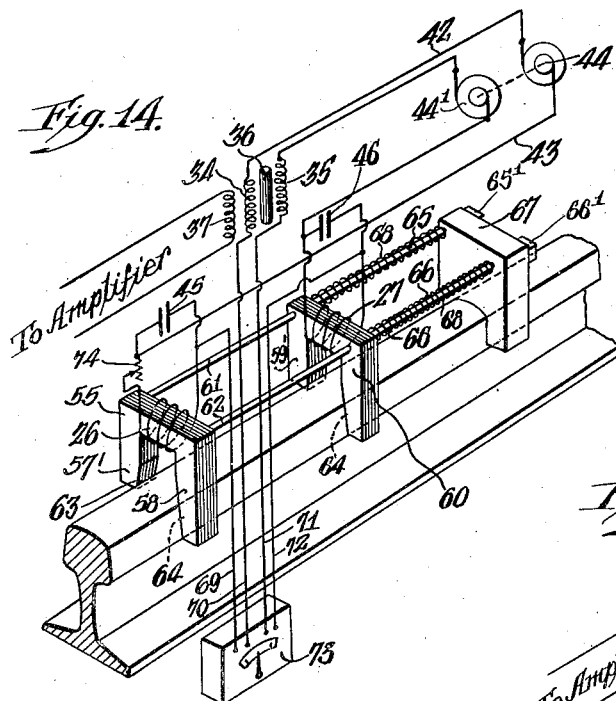
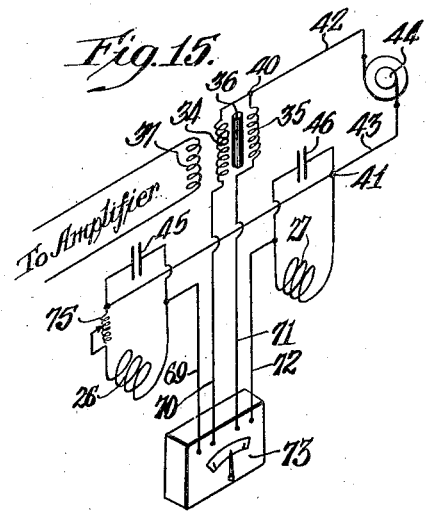
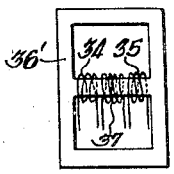
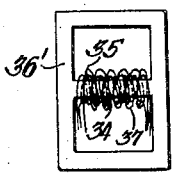
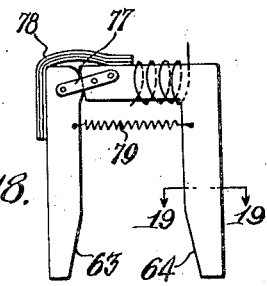
Inventor
Arthur E. F. Billstein
by *D. Steell Jackson and Son*
Attorney
Witnesses:
Elmer W. Hagler
Walter Ching

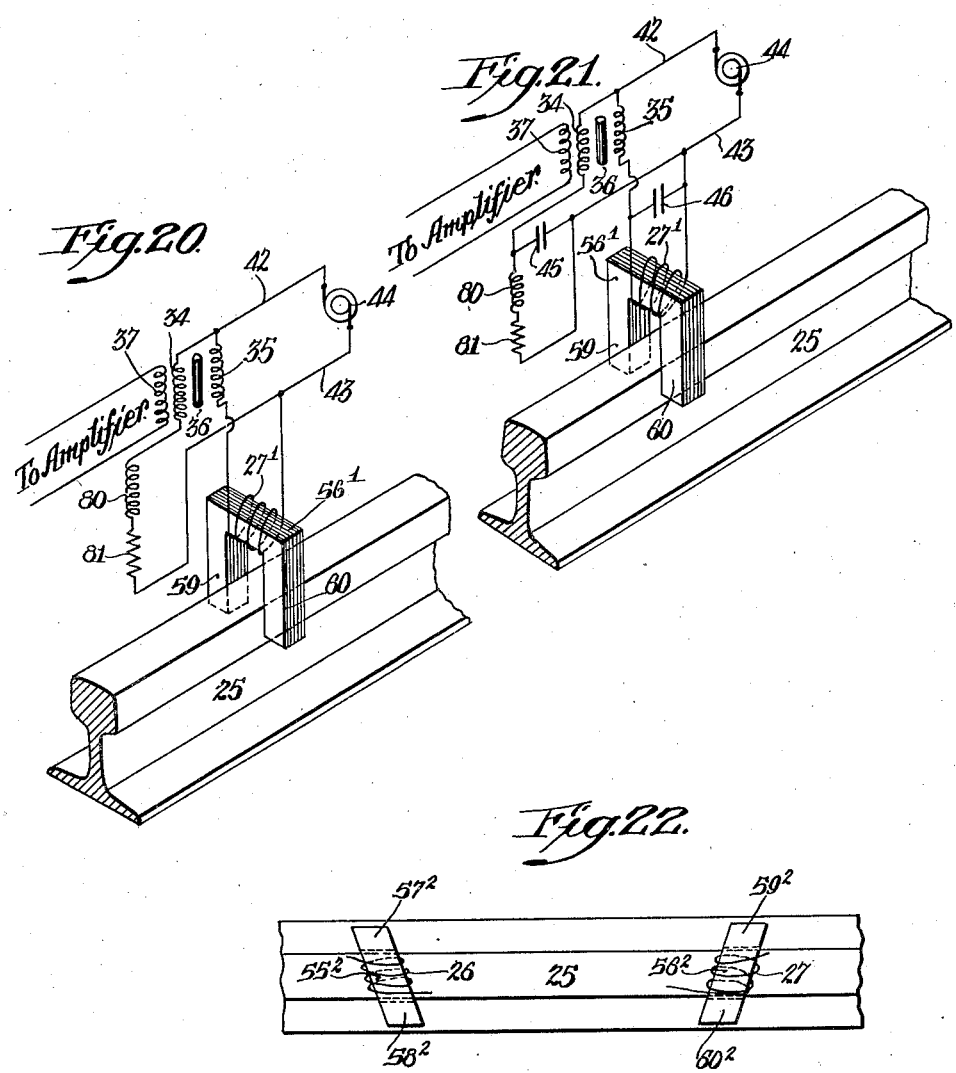

Patented June 15, 1937

2,084,274

UNITED STATES PATENT OFFICE 2,084,274

ELECTRICAL TESTER

Arthur E. F. Billstein, Altoona, Pa., assignor to The Pennsylvania Railroad Company, Philadelphia, Pa., a corporation of Pennsylvania Application February 29, 1932, Serial No. 595,679

64 Claims. (Cl. 175—183)

My invention relates to methods and apparatus for finding imperfections in metallic objects and especially in railroad rails, castings, structural shapes, pipes, etc. For convenience I will refer to the object to be tested as a "rail", whatever its shape.

This application is related in subject matter to my U. S. Patent No. 1,958,079, granted May 8, 1934, for Method and apparatus for testing for internal flaws.

A purpose of my invention is to intensify the indications of rail defects produced by a rail tester inductively related to the rail.

A further purpose is to reduce the displacement angle of the total current passing through a current variation indicator from a magnet coil with respect to the composite component of the current which is responsible for eddy current and hysteresis effects in the rail, and preferably to bring the total current into phase with the composite eddy current and hysteresis component, so that the indicator will be more sensitive to variation in the composite eddy current and hysteresis component due to rail defects.

A further purpose is to bring the total current, passing from a magnet coil to one of a set of balanced current variation indicator coils, more nearly into phase with the composite eddy current and hysteresis component of that current.

A further purpose is to place capacitative reactance in an inductive rail tester circuit to bring the total current passing through a current variation indicator more nearly, and preferably entirely, into phase with the composite eddy current and hysteresis component of that current.

A further purpose is to employ capacity in parallel with a magnet coil to increase the sensitivity of current variation indications obtained by passing the magnet coil current through one of a set of balanced current variation indicator coils.

A further purpose is to use capacity in series with a magnet coil and a current variation indicator coil, to magnify the readings in the indicator coil.

A further purpose is to operate one of a set of balanced coils of a tester for metallic defects upon a circuit branch having an artificial circuit resistance and reactance, and to pass current from a magnet coil in inductive relation to a rail through the other balanced coil of the set.

A further purpose is to pass the fluxes from two magnet coils of a tester for metallic defects through the same rail successively in different directions, preferably through opposite diagonal paths making the same angle with the edge of the rail.

A further purpose is to reduce the power requirement for a magnet coil by bringing the total magnet coil current more nearly into phase with the terminal voltage.

Further purposes appear in the specification and in the claims.

My invention relates not only to the methods involved, but to mechanism by which the methods may be carried out.

I have preferred to illustrate my invention by a few forms only among the many forms in which it may appear, selecting the forms primarily with a view to demonstrating the principles involved. The forms are considered by me to be entirely diagrammatic, even though structure is shown.

Figure 1 is a diagrammatic side elevation of a circuit in which no special precautions have been taken to bring the current from each magnet coil to the respective balanced coil into phase with its eddy current and hysteresis component. For convenience the magnet poles have been omitted and the magnet coils have been turned 90° into the plane of the paper. The correct position of the magnet coils is shown in Figure 1a.

Figure 1a is a diagrammatic perspective view, partly in section, of the circuit of Figure 1, with additional structure.

Figure 2 is a transverse section through a sound rail, showing the path of the flux in the rail.

Figure 3 is a section of Figure 2 upon the line 3—3, showing the path of the eddy current in a sound rail.

Figure 4 is a longitudinal section corresponding in position to Figure 3, showing the path of the eddy current through a rail having a transverse fissure.

Figure 5 corresponds to Figure 4, but shows the effect of a horizontal fissure on the path of the eddy current.

Figure 6:
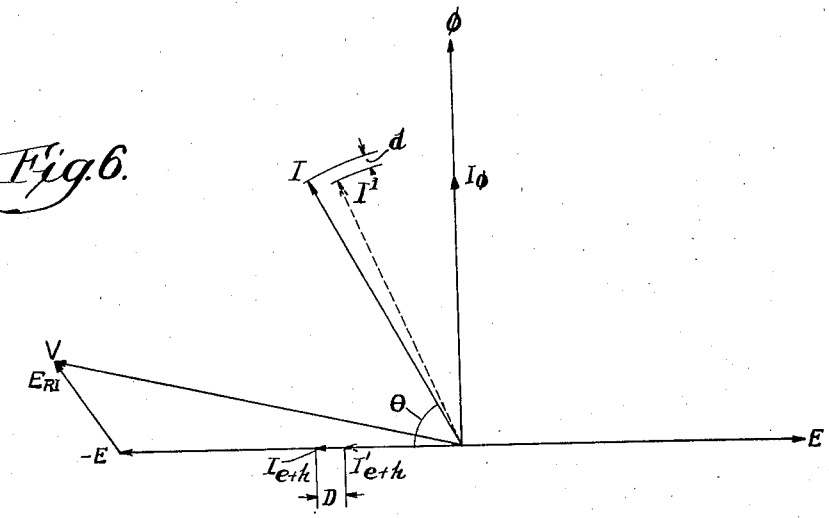

Figure 6 is a vector diagram for an assumed condition of the circuit of Figure 1, with the eddy current and hysteresis component greatly magnified with respect to other components.

Figure 7 is a diagrammatic side elevation of a circuit corresponding generally to Figure 1, showing capacity individual to each magnet coil.

Figure 8:
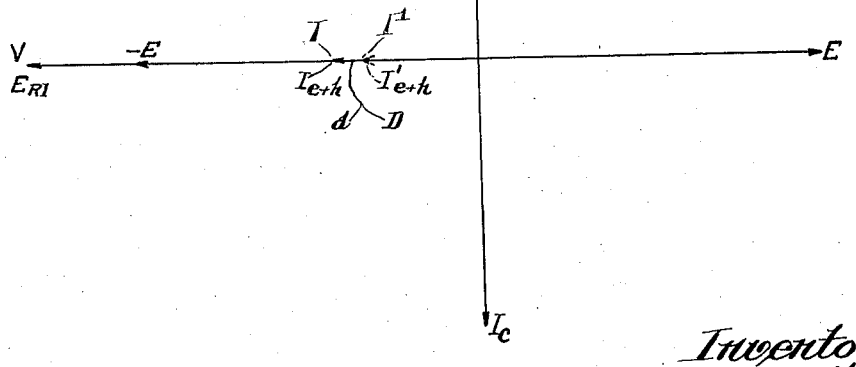

Figure 8 is a vector diagram for an assumed condition of the circuit of Figure 7, the eddy current and hysteresis component being exaggerated. In some features Figure 8 corresponds to Figure 6.

Figure 9 is a vector diagram for a different assumed condition of the circuit of Figure 7, with the eddy current and hysteresis component exaggerated.

Figure 10 is a diagrammatic perspective view of my invention, showing the magnet poles applied to the rail, and illustrating a somewhat different circuit from that of Figure 7.

Figure 11 is a vector diagram for an assumed condition of the circuit of Figure 10, the eddy current and hysteresis component being exaggerated.

Figure 12 corresponds generally to Figure 10, but shows a slightly different form of magnet pole, using the circuit of Figure 7, with slight modifications.

Figure 13 is a fragmentary diagrammatic perspective view of a somewhat different circuit embodying my invention.

Figure 14 is a diagrammatic perspective view of a variant circuit for carrying out my invention.

Figure 15 is a fragmentary diagrammatic perspective view showing a circuit differing slightly from that of Figure 14.

Figures 16 and 17 are diagrammatic side elevations of variant forms of the balanced coil current variation indicator which I preferably use.

Figure 18 is an isolated side elevation of a modification of the magnet coil and poles embodying my invention.

Figure 19 is a section taken upon the line 19—19 of Figure 18.

Figures 20 and 21 are diagrammatic perspective views showing variant circuits embodying my invention.

Figure 22 is a fragmentary top plan view of a different magnet coil arrangement which may be used in applying my invention.

In the drawings like numerals indicate like parts.

Latent defects in rails and similar objects cause serious danger of unexpected failure and necessitate quick, easy, and exact methods of testing. Although rails may be tested before they are placed in the track, many defects which subsequently cause failure do not exist before the rails are placed in use, and many rails which require testing are now in place.

In general the defects present may be divided into "transverse split heads", "horizontal split heads", "vertical split heads" and disturbances in the crystallographic structure of the rail. According to the American Railway Association nomenclature, a "transverse split head", or, as I prefer to call it, a transverse fissure, is one extending vertically and at right angles to the side of the rail, a "horizontal split head" or horizontal fissure is one extending horizontally, a "vertical split head" is one extending vertically and longitudinally of the rail head and a "compound fissure" is a combination of a horizontal and a transverse fissure. Of these defects, transverse fissures are by far the most dangerous because they greatly weaken the rail in its smallest dimension.

As a result of prior investigation, I have discovered that defects of all of the characters indicated may be located by passing two parallel magnetic fluxes of constantly varying intensities through the rail at spaced intervals. The fluxes are moved with respect to the rail. When both fluxes pass through sound portions of the rail, the currents producing the fluxes bear a definite relation to one another, and preferably the circuit constants are adjusted so that the currents are equal. When, by moving the fluxes with respect to the rail, one flux passes through a portion of the rail containing a defect and the other flux still passes through a sound portion of the rail or a portion containing a different defect, there is a variation in the currents producing the fluxes with respect to one another. The variation is exaggerated and indicated. I do not intend to claim this subject matter broadly in my present application, but I desire to protect certain features which greatly increase the sensitivity of my method.

The background of my present invention may best be understood by considering a specific circuit embodying my earlier invention, as for example that of Figure 1. The rail 25 is subjected to fluxes of constantly changing intensities from magnet coils 26 and 27, in inductive relation to the rail at spaced points. It will of course be understood that suitable poles will be used to reduce the reluctance of the magnetic paths from the coils to the rails. A circuit similar to Figure 1, having poles applied to a rail is shown in Figure 1a, and will be described later.

As defects in the head of the rail are much more dangerous than those occurring in other parts of the rail, and as the most dangerous defects are transverse fissures, I will describe my invention as applied especially to the discovery of transverse fissures in rail heads, although it will also discover horizontal, vertical and compound fissures and other defects.

The magnetic flux through the rail travels transversely of the rail as indicated at 28 in Figure 2. A vertical fissure in the rail increases the reluctance of the magnetic path and causes a decrease in the flux, at the same time changing the inductance of the magnet coil circuit.

The passage of flux through the rail causes secondary current within the rail in planes transverse to the direction of flux travel. The magnet coil is in effect the primary of a transformer of which the rail is the secondary.

The secondary or eddy current path is shown at 29 in Figure 3. When a transverse fissure intervenes, the resistance of the eddy current path is increased and the eddy current is correspondingly reduced. In Figure 4 I indicate a transverse fissure at 30 extending for some distance away from the plane of the paper in either direction. The path of the eddy current is changed at 31, thus causing a decrease in the eddy current, in the manner that laminating a core decreases the eddy current.

Horizontal fissures act exactly as do transverse fissures. In Figure 5 I show a horizontal fissure at 32, extending in either direction from the plane of the paper. The horizontal fissure changes the eddy current path 33, and causes a decrease in the eddy currents.

Variation in the eddy current reacts upon the magnet coil which produces it, much as variation in the load of a transformer secondary reacts on the transformer primary. As a result, the total current in the magnet coil changes.

Small vertical (longitudinal) split heads are generally less dangerous than other defects, and when they become large enough to be dangerous, they may be seen. For these reasons, I do not consider them in detail.

As the pair of similar magnet coils are moved with respect to the rail, they encounter the same magnetic and electrical conditions as long as each is opposite a sound portion of the rail. When, however, either magnet coil reaches a portion of the rail in which there is a defect, causing a change in the magnetic reluctance or electrical resistance of the rail, the total current in that magnet coil varies.

The presence of the defect can then be determined by any instrument which will indicate a variation in the total magnet coil currents. A second indication for the same defect is obtained as the other magnet coil of the pair passes the defect and undergoes a variation in its current.

I could of course employ ordinary ammeters, or an ammeter designed to indicate current differentials in two conductors, as a current variation indicator. However, ammeters are not sufficiently sensitive for the location of small defects. I therefore prefer to use balanced coils 34 and 35 of a set, oppositely wound on the same core 36 and having also, wound upon the same core, an indicator coil 37. Each of the balanced coils is connected in series to one of the magnet coils by one of the connections 38 or 39, and the branches are in turn connected in parallel at 40 and 41 to leads 42 and 43 from an alternating current source 44.

Instead of winding the coils 34 and 35 oppositely and connecting them directly, I may wind the coils in the same direction and connect them oppositely as indicated in Figures 12 and 13. There the coil 35' is wound in the same direction as the coil 34, but is oppositely connected to the point 40 and the connection 39.

The presence of the core 36 is also not in all cases necessary. Particularly where high frequency current is used, the core 36 may be entirely omitted as indicated in Figure 13.

The coils 34 and 35 are balanced so that normally they exert identical opposite magnetic effects upon their common core and, through it, upon the indicating coil 37. Where no core is used, they normally exert identical opposite magnetic effects directly upon the coil 37. While the balancing effect could be obtained where the coils 34 and 35 normally carried different currents by placing fewer turns in the coil carrying the greater current, so that the number of ampere turns in the coils 34 and 35 are equal, I much prefer to use the same number of turns in the coils 34 and 35, and to have them carry the same currents when both are operating on normal rail sections.

Since the currents in the coils 26 and 27 are normally the same, as the magnet coils and their poles are alike, there is ordinarily no tendency to induce current in the indicator coil 37. When, however, one of the magnet coils is moved to a position opposite a defect in the rail, the current in that coil changes and the currents in the balanced coils are no longer equal. This inequality causes flux to cut the indicator coil and generate current in it. The indicator coil is suitably connected to an amplifying and indicating circuit.

Thus far I have primarily considered aspects of my invention not claimed in the present application.

I have discovered that the sensitivity of the indicator coil may be much increased, particularly for detecting transverse and horizontal fissures, but also for detecting other defects as well, if the total current from each magnet coil to its corresponding balanced coil be brought more nearly into phase with its eddy current and hysteresis component.

When I refer to the eddy current and hysteresis component, I mean the composite component made up of the component of the magnet coil current which induces eddy current in the rail and the component of the magnet coil current which is expended in hysteresis. I am not assuming that the eddy current component is in phase with the hysteresis component, but, whatever the phase angles between the two, their vector sum, called the eddy current and hysteresis component, will by the component which changes when either the eddy current or the hysteresis component changes. From experiment I find that, in my invention, the change is almost entirely in the eddy current component rather than the hysteresis component when a rail defect is encountered.

With my present invention, a change in the primary current component responsible for inducing eddy current in the rail and expended in hysteresis produces a more nearly corresponding change in the total primary current, and is more effective upon the current variation indicator.

To obtain this increased sensitivity, I preferably place capacitative reactance in each individual magnet coil circuit. Most desirably, I shunt the capacity across each magnet coil.

Since the members of the set of balanced coils are normally exactly opposed in their inducing effects upon the indicator coil, the extent of the indication produced when the current in one balanced coil changes is dependent upon the actual current change rather than the percentage of change.

For example, if 25.0 amperes were carried through each balanced coil 34 and 35 and the current in one coil dropped to 24.9 amperes, an inducing effect would be produced upon the indicator coil 37 corresponding to a 0.1 ampere inducing current. Likewise, if a 5.0 ampere current flowed through each coil in the set of balanced coils, and the current in one coil dropped to 4.9 amperes, the inducing effect on the indicator coil would again correspond to a current flow of 0.1 ampere. This would be the case in both instances, notwithstanding that in the first instance the change was 0.4% of the initial current and in the second it was 2% of the initial current.

In other words, the balanced coils cancel the inducing effects of the normal currents and give an indication corresponding only to the actual change in current.

The exact mechanism by which a change in the secondary circuit conditions due to a rail defect reacts upon the primary current is very difficult to analyze, both because of the numerous factors involved and of the practical impossibility of separately measuring the influence of each factor. For the purpose merely of setting forth a possible theory explaining certain aspects of the phenomenon, but without any intention of indicating that this is the final theoretical explanation, or that this completely accounts for all or for any of the aspects of the problem, I have included vector diagrams for certain of the circuits which I use.

I in no case intend to make my application depend upon the theoretical correctness or practical utility of my theory, because the circuits which I here outline are advantageous for the purposes indicated, whether or not the explanation which I give is the correct one.

For a discussion of a transformer having a core, but no secondary winding, and of the fundamental vector diagram, see Lawrence, "Principles of Alternating Current Machinery" (1st. ed. 1916, McGraw-Hill Book Company, New York) pages 165, 166.

Due to space limitations, I have greatly exaggerated the eddy current and hysteresis components and displacement angles in the diagrams.

Considering the circuit of Figure 1, I have drawn a vector diagram, Figure 6, showing the various components of the current in one of the magnet coils 26 or 27. In the vector diagrams herein, counterclockwise rotation of vectors is assumed.

The secondary voltage E, effective in the rail, is produced by a changing magnetic flux $\phi$, in leading quadrature with respect to the secondary voltage E. The flux $\phi$ induces eddy currents in the rail and magnet core and causes hysteresis losses in the rail and magnet core. The eddy current and the hysteresis losses in the magnet core are very small, and whatever they are, they are constant, while the eddy current and the hysteresis losses in the rail are large, and are subject to variation when defects in the rail are encountered. The magnitude of the eddy current in the rail is due largely to the fact that the rail is not laminated.

The secondary voltage E is due to a component $-E$ of the primary voltage, which component $-E$ is equal and opposite to the secondary voltage E. The flux $\phi$ which causes eddy current and hysteresis losses is produced by a current $I\phi$, in phase with the flux $\phi$. This component $I\phi$ is referred to as the magnetizing component of the magnet current, since it sets up and maintains the flux $\phi$.

The other component of the magnet coil current is the component $I_{e+h}$, which is the portion of the magnet coil current which sets up eddy current and is expended in hysteresis in the rail and core of the magnet. It is this component, $I_{e+h}$, which changes when a rail defect is encountered.

It is generally assumed, and will not for the moment be controverted, that the eddy current and hysteresis component $I_{e+h}$ of the magnet coil current is in phase with the component $-E$ of the magnet coil voltage.

The total magnet coil current, I, is the resultant of its two components, the magnetizing component $I\phi$ and the eddy current and hysteresis component $I_{e+h}$. In the circuit of Figure 1, the balanced coils each carry the current I from one of the magnet coils, without appreciable alteration.

The component of the magnet coil terminal voltage V used to overcome the magnet coil resistance is $E_{RI}$, in phase with the total current I. Therefore, for the circuit of Figure 6, the voltage V is closely in phase with the back E. M. F. $-E$.

If, now, one of the magnet coils pass a defect in the rail, which causes a decrease D in the eddy current and hysteresis component $I_{e+h}$, to a new valve $I'_{e+h}$, Figure 6, the resultant current I will then decrease by an amount d to a new value I'. However, if, as in the normal case depicted in Figure 6, the displacement angle $\theta$ between the total magnet coil current I and the eddy current and hysteresis component $I_{e+h}$ is large, a considerable change in the eddy current and hysteresis component $I_{e+h}$ will produce a relatively small change in the total current I. Thus, in Figure 6, while the difference D between the vectors $I_{e+h}$ and $I'_{e+h}$ is relatively large, the difference d between the vectors I and I' is relatively small.

Therefore, although the defect produces a marked change in the eddy current and hysteresis component of the magnet coil current, very little change occurs in the total current passing through one of the balanced coils from the magnet coil, and correspondingly the indicator coil current is small. It will be remembered that the indicator coil 37 is affected only by the actual change in balanced coil current, that is, by the actual difference between the number of ampere turns in one balanced coil and the number of ampere turns in the other at any moment.

For this reason there is a relatively low sensitivity of indication.

By my invention I am enabled to correct this difficulty and to increase greatly the sensitivity of the indications obtained. To accomplish this purpose, the total magnet coil current I is brought more nearly into phase with the eddy current and hysteresis component $I_{e+h}$.

In Figure 7 I show a circuit corresponding generally to that of Figure 1, but modified in accordance with my present invention by inserting capacitative reactance (condensers) at 45 and 46 in parallel with each magnet coil 26 and 27. In Figure 8 I illustrate a vector diagram for an assumed condition of the circuit of Figure 7. Figure 8 represents one circuit branch, including one of the magnet coils, its shunting capacity and its connection to one of the balanced coils.

Most of the vectors are the same in Figure 8 as in Figure 6. The effect of the capacitative reactance due to the condensers in each magnet coil branch is to introduce a capacitative component Ic in leading quadrature with respect to $-E$. The total current I thus is brought by vector addition more nearly into phase with the eddy current and hysteresis component $I_{e+h}$ of the magnet coil current. It is preferable to regulate the amount of capacity introduced with respect to the inductance of the circuit and to the frequency, to bring the total current I in the circuit branch directly into phase with the eddy current and hysteresis component $I_{e+h}$. This is the condition shown in Figure 8, where I and $I_{e+h}$ lie along the same line. However, it will be evident that advantage may be obtained from my invention by decreasing the phase angle $\theta$ between the total current in the circuit branch and the eddy current and hysteresis component, without necessarily actually bringing them into phase.

In the condition of the circuit illustrated in Figure 8, the eddy current and hysteresis component $I_{e+h}$ and the total current I are also in phase with the back E. M. F. $-E$, and therefore it happens that the capacitative current Ic is exactly equal and opposite to the magnetizing current $I\phi$. It should be noted, however, this is not always the case, and that the relative magnitudes of the magnetizing current $I\phi$, and the capacitative current Ic will depend upon the phase angle of the eddy current and hysteresis component $I_{e+h}$ with respect to the back E. M. F. $-E$.

From Figure 8 it will be evident that, when one of the magnet coils 26 or 27 encounters a defect in the rail, it produces a decrease D in the eddy current and hysteresis component $I_{e+h}$ of the magnet coil current to a new value $I'_{e+h}$, and an identical change d in the total current is produced, from I to I'. In other words, the magnitudes of D and d are now the same. Therefore, the change in magnet coil current is reflected by an exactly similar change in balanced coil current, and by a corresponding change in indicator coil current, without decrease in sensitivity such as exists in the conditions described with reference to Figure 6.

While, in the previous discussion, I have indicated that the eddy current and hysteresis component $I_{e+h}$ may be in phase with the back E. M. F. $-E$, this is not necessarily the case, and in fact the eddy current and hysteresis component $I_{e+h}$ has been found by experiment to be displaced in many cases from the back E. M. F. component $-E$.

In Figure 9 I show the eddy current and hysteresis component $I_{e+h}$ leading the back E. M. F. component $-E$ by an angle $\alpha$, which varies with the rail conditions and with the frequency of the magnet coil current.

The reason for displacement of the phase angle of the eddy current and hysteresis component $I_{e+h}$ of the total magnet coil current with respect to the back E. M. F. $-E$ would appear to be primarily the change in eddy current displacement rather than the change in hysteresis displacement, since the phase angle of the hysteresis does not appear to vary for a given material.

The total current I has been brought into phase with the eddy current and hysteresis component $I_{e+h}$ by relatively increasing the magnitude of the capacitative current $I_c$ with respect to that present in Figure 8.

Thus, in Figure 9, the eddy current and hysteresis component $I_{e+h}$, decreases due to movement of the magnet coil carrying this current over a rail defect, by an amount D, to a new value $I'_{e+h}$, and correspondingly an identical change $d$ of the total current I takes place, I decreasing to a new value $I'$.

In Figures 8 and 9, the voltage component $E_{RI}$ which overcomes the magnet coil resistance is always in phase with the total current. It will be seen from these figures that with the condensers the terminal voltage V is always relatively closely in phase with the total current I, at least much more nearly so than without the condensers, as in Figure 6. In view of this fact, the effect of the parallel capacity 45 or 46 is evidently to bring the total current I more nearly into phase with the terminal voltage. While the primary purpose is to bring the total current I into phase with its eddy current and hysteresis component $I_{e+h}$, the incidental effect of bringing the total current I more nearly into phase with the terminal voltage V is highly desirable, since it reduces the power requirement for operation of the circuit, in the same way that partial or complete tuning of the circuit would reduce the power requirement.

Thus, while increasing the sensitivity of my rail tester, I at the same time reduce the power requirement without the need for additional apparatus.

My invention does not comprise power factor correction in the ordinary sense, as that involves shunting capacity across the power source. This would mean that the current I coming to either one of the balanced coils, instead of being in phase with the eddy current and hysteresis component of that current, would be out of phase with that component and would not be brought into phase until it reached a point beyond the balanced coils in the direction of the source.

However, as I have shown, the increase in the sensitivity of either balanced coil as a rail defect indicator depends upon bringing the current through that balanced coil into phase with its eddy current and hysteresis component. Bringing the current into phase with its eddy current and hysteresis component beyond the balanced coil, while leaving it far out of phase when it passed through the balanced coil, would be disadvantageous. Therefore, the best place to bring the magnet coil current into phase with its eddy current and hysteresis component is that which I have chosen: namely, in the individual branch between the point 41 and the balanced coil corresponding to the individual magnet coil.

There are of course other ways by which the primary current may be brought more nearly into phase with its eddy current and hysteresis component. Since I have pointed out the need, others will doubtless vary the circuits shown. I suggest only a few other ways to accomplish this purpose.

For example, I show in Figure 10 shunts 47 and 48, having low resistances 49 and 50, placed across the coils. The effect is to create a large shunting current which adds a large current vector $I_s$ in phase with the back E. M. F. $-E$, as shown in Figure 11.

This brings the total current I more nearly into phase with its eddy current and hysteresis component $I_{e+h}$. The change $d$ in total current when a defect is encountered is then very nearly the same as the change D in eddy current and hysteresis component.

Aside from these features, Figure 11 is similar to the other vector diagrams.

The form of Figure 10 would be initially undesirable because the magnet coils would be robbed of current by the shunts, so that it would be necessary to increase the voltage in order to obtain sufficient current in the magnet coils. However, I give it as an alternative method because it would be possible to gain part of the advantage of my invention by its use.

As a further example I show in Figure 13 capacity at 51 and 52 in series with the individual magnet coils. This I do not recommend, but I disclose it because it offers part of the advantage of my invention.

The circuit having capacity in parallel with the magnet coils is so much superior to the others that I illustrate it in Figures 7, 12, 14, 15 and 21. There is a by-product advantage of using capacity in parallel which is not available with the other forms.

The total current is brought very nearly or entirely into phase with the terminal voltage, so that in effect the part of the circuit including each individual magnet coil is brought more or less close to resonance. Therefore, large currents are built up in the magnet coils without heavy demands upon the power source.

In this way I may employ a relatively light and easily portable power source while obtaining a large magnet coil current. Although the more or less nearly resonant current will not be carried through the balanced coil, it will produce corresponding fluctuations in the balanced coil current and the balanced coil current will have the advantage of being nearly or entirely in phase with its eddy current and hysteresis component.

Certain of the features of the device which I use in practice are made clear by the figures. In Figures 1a and 10 I show connection of the indicating coil 37 to a suitable amplifier 53, which in turn is connected to an indicating device 54.

In Figure 12 I indicate an amplifier 53, as before, but the amplifier is connected to a recorder 54' of any suitable type.

Amplifiers are well known in the interpretation of radio circuits and are described in many radio books. A number are described in Ballantine, "Radio Telephony for Amateurs" (2d ed.

1923) pages 249–260. Recorders, as for example syphon recorders, are also well known.

Each of the magnet coils 26 and 27 is wound on a suitably laminated core 55 or 56 having poles 57 and 58 or 59 and 60 which assist in creating a low reluctance path between the coils and the rail. The cores are held at a predetermined distance apart by frame members 61 and 62.

In Figure 12 I show the poles 57' and 59' on one side of the rail somewhat shortened to permit them to ride over rail bonds or other projections which might otherwise be encountered.

The poles in Figure 14 have been shortened at one side and also tapered at 63 and 64 to enable them to fit different rail sections. In Figure 14 I also extend the frame members 61 and 62 at 65 and 66 to resiliently support a guard 67 in front of the poles under the action of springs 68. The frame extensions 65 and 66 pass through openings in the guard 67 and carry heads 65' and 66' against which the springs 68 act. The guard prevents injury to the poles from burrs or wickers on the sides of the rail.

In Figures 14 and 15 I connect the magnet coils to the balanced coils by connections 69, 70, 71 and 72 through opposite sides of a double indicating ammeter 73. I place a variable resistance 74 in series with one branch in Figure 14. I may thus conveniently balance the currents through the individual magnet coils by adjusting the resistance until the ammeter indicates that equal currents are flowing through both branches when the magnet coils are adjacent a normal rail section.

In Figure 15 I adjust the currents by means of the variable inductance 75.

In Figure 15 the connections of one of the magnet coils and the corresponding connections through the ammeter are reversed with respect to those in Figure 14. It will of course be understood that the instantaneous direction of the flux across the rail at the spaced points is immaterial providing the connections are properly made to the balanced coils, so that one balanced coil inductively opposes the other. Thus in Figure 14 the fluxes are instantaneously in the same direction, and in Figure 15 they are instantaneously in opposite directions, but the effect upon the balanced coils is the same.

In Figures 16 and 17 I diagrammatically illustrate two types of windings for the balanced coils and indicator coil. In both figures the core 36' is of shell type. In Figure 16 the balanced coil windings 34 and 35 are placed on opposite sides of the indicator coil 37, while in Figure 17 the windings are one within another and the indicator coil winding is preferably the inside winding.

In Figure 18 I show a detail view of a somewhat different type of magnet core and poles. The poles are tapered as indicated at 63 and 64 and are also interiorly curved as shown at 76 in Figure 19. The core is hinged at 77 and the hinge is bridged by a strap 78 of magnetic material. The opposite poles are resiliently drawn inwardly at 79.

It will be understood that I describe this structure merely to indicate desirable apparatus which I may use, but without any intention to limit myself to that shown.

When the first magnet coil of my rail tester is opposite a rail defect, a change in the magnet coil current takes place by reason of a change in the eddy current and hysteresis component of that current. At the moment when this change takes place, the current through the second magnet coil, presumably opposite a sound portion of the rail, remains unchanged and acts as a standard of comparison against which the change in the current through the first magnet coil is measured. As the rail tester moves farther along the rail, the first magnet coil passes the defect and again comes opposite a sound portion of the rail, restoring its current to normal. However, the second magnet coil now reaches a position opposite the defect, and its current undergoes a change which is compared with the now standard current through the first magnet coil.

If two defects are close together, an ordinary indication will be obtained when the first magnet coil approaches them. Then, when the first magnet coil passes the first defect, if both magnet coils come simultaneously to positions opposite defects, which rarely happens, there will still be a second indication, as the defects will not be identical, and so the currents in the magnet coils will be influenced differently, and one will still act as a standard for the other.

Thus it is evident that the currents through the respective coils alternately act as standards of comparison against which the variation due to a defect is indicated, and that two such variations are obtained for each defect, thus giving a check on each indication.

While I consider it important to have two magnet coils when testing rails in track, so that the rail itself always determines the standard against which indications of defects are obtained, and errors due to variations in the normal character of the individual rail are thus eliminated, for some purposes, as for example, for the testing of rails or other structural shapes at the rolling mill, a single magnet coil may suffice.

In this case I build up the electrical characteristics of the standard circuit artificially, instead of using a magnet coil applied to the rail to determine the standard. In Figures 20 and 21 I show circuits which have the same form of current variation indicator as in the other figures, but which use only a single magnet coil.

In Figure 20, the circuit branch including the magnet coil 27' is exactly like the circuit branch including the magnet coil 27 in Figures 1 and 1a. However, the magnet coil 26 has been eliminated, and instead the impedance of the circuit branch through the magnet coil 26 is artificially reproduced by inserting in series, in parallel or in series-parallel, suitable reactance 80 (either inductive or capacitative, and resistance 81.

The impedance will be adjusted by varying the reactance 80 and the resistance 81 for a given object to be tested until, when the magnet coil 27 is opposite a sound portion of the object (generally referred to for convenience as a rail) the number of ampere turns in the balanced coil 34 will equal the number of ampere turns in the balanced coil 35, and the phase characteristics of the currents in the two coils will be comparable.

The artificially produced standard current may be used in a circuit in which the total current is brought more nearly into phase with its eddy current and hysteresis component as shown in Figure 21. In this form the impedance, built up of reactance 80 (either inductive or capacitative) and resistance 81, is shunted by capacity 45, similar capacity 46 shunting the magnet coil 27' in the other branch.

I do not regard the circuits of Figures 20 and 21 as preferable, because of the time consumed in artificially duplicating the impedance of the magnet coil 27', and because of the likelihood that individual rails, even those rolled successively on the same mill, will vary enough to require readjustment of the reactance 80 or the resistance 81.

When the circuits are properly adjusted, the vector diagram for the circuit of Figure 20 is substantially that shown in Figure 6 for the circuit of Figures 1 and 1a, and the vector diagram for the circuit of Figure 21 is substantially that for the circuits of Figures 7, 12, 14 and 15, shown in Figures 8 and 9.

As previously pointed out, the factor which primarily makes possible the detection of defects by my system is the change in eddy current produced by the defect. Compared to the eddy current change, the influence of hysteresis is slight in any case. Where, as in the circuits of Figures 7, 10, 12, 13, 14, 15 and 21, the total current is brought more or less closely into phase with the eddy current and hysteresis component $I_{e+h}$, part of the effect of change of hysteresis is destroyed, since the change in magnetizing current $I_\phi$ which accompanies change in hysteresis, because of change in reluctance of the magnetic path, has very little influence on the total current.

As previously noted, the eddy current paths lie in planes longitudinal of the rail, and therefore transverse and horizontal fissures have the most pronounced effect, since they extend directly across and interrupt the eddy current. Fissures in other planes have a less marked effect upon the eddy current, and therefore it is not always possible to obtain a sharp indication for some of them.

To overcome this difficulty, I pass the flux through the rail successively in different directions, so that the eddy currents successively take different paths, and, if the first path is not directly interrupted by a fissure, the second is likely to be. In Figure 22 I show magnet coils 26 and 27, respectively wound upon cores $55^2$ and $56^2$, having pole pieces $57^2$, $58^2$, $59^2$, and $60^2$ on the sides of the rail. The terminals of the magnet coils are connected in any one of the circuits shown.

The flux from magnet coil 27 passes diagonally across the rail in one direction, while the flux from magnet coil 26 takes an opposite diagonal path through the rail. Both magnet coils react in the same way to a normal rail, but a fissure which markedly reduces the current through magnet coil 26 may not have a pronounced effect upon the current through magnet coil 27 because of the angle of the fissure with respect to the eddy current path of the latter coil.

Many and various eddy current paths may be obtained with the same or with different magnet coils, and my invention includes any arrangement which successively passes flux through different paths and so obtains different eddy current paths.

The frequency employed affects the path of the eddy current in the rail and may well be chosen with this in view. High frequencies and low frequencies act differently and give different eddy current distributions because of the greater skin effect with high frequency than with low frequency and the greater tendency of high frequency current than of low frequency current to select its path so as to improve the coupling.

The current used will depend upon the portion of the magnetizing curve for the rail on which I desire to work. It is preferable to maintain the magnetic flux through the rail at a value at which it is sensitive to changes in magnetomotive force and for this reason to keep the magnetic flux well below the magnetic saturation point of the rail. As the magnetizing curve for steel is very steep during a portion of its length, there is a wide range of magnetization of the steel which will serve the purpose.

This permits the selection of relatively low flux with small eddy current or relatively large flux with correspondingly large eddy current. Either may prove desirable according to the character of the other conditions of the test.

I believe that I am the first to employ any means in an inductive tester circuit to bring the total magnet coil current into phase with the eddy current and hysteresis component of that current before passing the current through a current variation indicator.

I further believe that I am the first, to obtain the advantages of a condition approaching resonance in a flaw detector.

While my invention has been in the past chiefly applied to magnetic material, it will be evident that it will also work, though to somewhat less advantage, upon non-magnetic material, because the presence of defects is largely determined by the change in eddy current, and secondary or eddy current will be produced in non-magnetic material just as in magnetic material. Therefore, when I refer to my exploring coils as "magnet coils" I simply mean that they are flux-producing coils, and do not intend to imply that they necessarily or preferably operate on magnetic material.

Furthermore, when I mention the eddy current and hysteresis component, I mean the component which is the vector sum of the eddy current component and of the hysteresis component, if any. When operating on non-magnetic material, the hysteresis component will be non-existent, and the eddy current and hysteresis component will then be the same as the eddy current component. However, to include the possible presence of the hysteresis component, I refer generally to the component made up of the eddy current and of the hysteresis, if any, as the eddy current and hysteresis component.

In the best form of my invention, the two opposed coils of the balanced set are each in series with a magnet coil, and the series branches are connected in parallel. This is very important, as any possible error due to change in the voltage of the source, or to change in resistance of leads near the source is eliminated. However, the branches may be in separate circuits, for example supplied respectively by currents from generators on the same shaft, as shown at 44 and 44', Figure 14. The circuit of this figure operates in the same general way as that shown in Figure 7.

It will be evident that the introduction of capacity in the individual magnet coil circuit branches opposes the inductive reactance of the magnet coil and reduces the resultant reactance of the circuit branch, thus increasing the sensitivity of the indication.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:

1. The method of detecting defects in a metallic object, which consists in passing alternating current in inductive relation to the object, using a component of said alternating current to set up eddy current in the object and to be expended in hysteresis in the object, where the object is magnetic, in reducing the displacement angle of said alternating current with respect to said component by capacitative reactance in parallel with the alternating current path in inductive relation to the object, and in determining variation in said alternating current, due to change in said component, at a point, out of inductive relation with the object, at which the displacement angle is so reduced.

2. The method of detecting defects in a metallic object, which consists in passing alternating current in inductive relation to the object, using a component of said alternating current to set up eddy current in the object and to be expended in hysteresis in the object, where the object is magnetic, in bringing said alternating current into phase with said component and in determining variation in said alternating current, due to change in said component, at a point, out of inductive relation with the object, at which said alternating current and said component are in phase.

3. The method of detecting defects in a metallic object, which consists in passing alternating current in inductive relation to the object, using a component of said alternating current to set up eddy current in the object and to be expended in hysteresis, where the object is magnetic, in reducing the displacement angle of said alternating current with respect to the voltage by capacitative reactance in parallel with the alternating current path in inductive relation to the object, and in determining variation of said alternating current, due to change in said component, at a point, out of inductive relation with the object, at which the displacement angle is so reduced.

4. The method of detecting defects in a metallic object, which consists in passing alternating current in inductive relation to the object, using a component of said alternating current to set up eddy current in the object and to be expended in hysteresis in the object, where the object is magnetic, in bringing said alternating current into phase with the voltage by capacitative reactance in parallel with the alternating current path in inductive relation to the object, and in determining variation in said alternating current, due to change in said component, at a point, out of inductive relation with the object, at which said alternating current and the voltage are in phase.

5. The method of detecting defects in a metallic object, which consists in passing alternating current in inductive relation to the object in such manner as to pass flux through the object transversely to the object, using a component of said alternating current to set up eddy current in the object and to be expended in hysteresis in the object, where the object is magnetic, in reducing the displacement angle of said alternating current, both with respect to said component and to the voltage and in determining variation in said alternating current, due to change in said component, at a point, out of inductive relation with the object, at which the displacement angle is so reduced.

6. The method of detecting defects in a metallic object, which consists in passing alternating current in inductive relation to the object in such manner as to pass flux through the object transversely to the object, using a component of said alternating current to set up eddy current in the object and to be expended in hysteresis in the object, where the object is magnetic, in bringing said alternating current into phase both with said component and with the voltage and in determining variation in said alternating current, due to change in said component, at a point, out of inductive relation with the object, at which said alternating current is in phase with said component and with the voltage.

7. The method of detecting defects in a metallic object, which consists in passing alternating current through a path in inductive relation to the object in such manner as to pass flux through the object transversely to the object, thereby setting up eddy current in the object, in introducing capacitative reactance into the alternating current path to oppose inductive reactance and in determining variation in said alternating current, due to change in eddy current, at a point, out of inductive relation with the object, at which the capacitative reactance is effective to reduce the resultant reactance.

8. The method of detecting defects in a metallic object, which consists in passing alternating current through a path in inductive relation to the object, thereby setting up eddy current in the object, in introducing capacitative reactance into the alternating current path, in parallel with the path in inductive relation to the object, to oppose inductive reactance, and in determining variation in said alternating current, due to change in eddy current, at a point, out of inductive relation with the object, at which the capacitative reactance is effective to reduce the resultant reactance.

9. The method of detecting defects in a metallic object, which consists in passing alternating current through a path in inductive relation to the object, using a component of said alternating current to set up eddy current in the object and to be expended in hysteresis in the object, where the object is magnetic, in artificially introducing low resistance in parallel with the path in inductive relation to the object and in determining variation in said alternating current, due to change in said component, at a point, out of inductive relation with the object, at which said alternating current is influenced by the low resistance in parallel.

10. The method of detecting defects in a metallic object, which consists in passing alternating current through a path in inductive relation to the object, using a component of said alternating current to set up eddy current in the object and to be expended in hysteresis in the object, where the object is magnetic, in artificially introducing low resistance in parallel with the path in inductive relation to the object, in increasing the voltage and in determining variation in said alternating current, due to change in said component, at a point, out of inductive relation with the object, at which said alternating current is influenced by the low resistance in parallel.

11. The method of detecting defects in a metallic object, which consists in passing alternating current in inductive relation to the object, using a component of said alternating current to set up eddy current in the object and to be expended in hysteresis in the object, where the object is magnetic, in reducing the displacement angle of said alternating current with respect to said component by capacitative reactance in parallel with the alternating current path in inductive relation to the object, in comparing said alternating current with a standard alternating current at a point at which the displacement angle is so reduced and in indicating variation of said alternating current and the standard alternating current with respect to one another, due to change in said component.

12. The method of detecting defects in a metallic object, which consists in passing alternating current in inductive relation to the object, using a component of said alternating current to set up eddy current in the object and to be expended in hysteresis in the object, where the object is magnetic, in bringing said alternating current into phase with said component, in comparing said alternating current with a standard alternating current at a point at which said alternating current and said component are in phase and in indicating variation in said alternating current and the standard alternating current with respect to one another, due to change in said component.

13. The method of detecting defects in a metallic object, which consists in passing alternating current in inductive relation to the object, using a component of said alternating current to set up eddy current in the object and to be expended in hysteresis in the object, where the object is magnetic, in reducing the displacement angle of said alternating current with respect to the voltage by capacitative reactance in parallel with the alternating current path in inductive relation to the object, in comparing said alternating current with a standard alternating current at a point at which the displacement angle is so reduced and in indicating variation of said alternating current and the standard alternating current with respect to one another, due to change in said component.

14. The method of detecting defects in a metallic object, which consists in passing alternating current in inductive relation to the object, using a component of said alternating current to set up eddy current in the object and to be expended in hysteresis in the object, where the object is magnetic, in bringing said alternating current into phase with the voltage by capacitative reactance in parallel with the alternating current path in inductive relation to the object, in comparing said alternating current with a standard alternating current at a point at which said alternating current and the voltage are in phase and in indicating variation of said alternating current and the standard alternating current with respect to one another, due to change in said component.

15. The method of detecting defects in a metallic object, which consists in passing alternating current in inductive relation to the object in such manner as to pass flux through the object transversely to the object, using a component of said alternating current to set up eddy current in the object and to be expended in hysteresis in the object, where the object is magnetic, in reducing the displacement angle of said alternating current both with respect to said component and to the voltage, in comparing said alternating current with a standard alternating current at a point at which the displacement angle is so reduced and in indicating variation of said alternating current and the standard alternating current with respect to one another, due to change in said component.

16. The method of detecting defects in a metallic object, which consists in passing alternating current in inductive relation to the object in such manner as to pass flux through the object transversely to the object, using a component of said alternating current to set up eddy current in the object and to be expended in hysteresis in the object, where the object is magnetic, in bringing said alternating current into phase both with said component and with the voltage, in comparing said alternating current with a standard alternating current at a point at which said alternating current is in phase with said component and with the voltage and in indicating variation of said alternating current and the standard alternating current with respect to one another, due to change in said component.

17. The method of detecting defects in a metallic object, which consists in passing alternating current through a path in inductive relation to the object in such manner as to pass flux through the object transversely to the object, thereby setting up eddy current in the object, in introducing capacitative reactance into the alternating current path to oppose inductive reactance, in comparing said alternating current with a standard alternating current at a point at which the capacitative reactance is effective to reduce the resultant reactance and in indicating variation of said alternating current and the standard alternating current with respect to one another, due to change in eddy current.

18. The method of detecting defects in a metallic object, which consists in passing alternating current through a path in inductive relation to the object, thereby setting up eddy current in the object, in introducing capacitative reactance in parallel with the path in inductive relation to the object, to oppose inductive reactance, in comparing said alternating current with a standard alternating current at a point at which the capacitative reactance is effective to reduce the inductive reactance and in indicating variation of said alternating current and the standard alternating current with respect to one another, due to change in said component.

19. The method of detecting defects in a metallic object, which consists in simultaneously passing two alternating currents in inductive relation to the object at spaced points along the object, using a component of each of said alternating currents to set up eddy current in the object and to be expended in hysteresis in the object, where the object is magnetic, in reducing the displacement angle of each of said alternating currents with respect to its said component by capacitative reactance in parallel with each alternating current path in inductive relation with the object, in comparing said alternating currents at a point at which each displacement angle is so reduced and in indicating variation of one of said alternating currents with respect to the other, due to change in said component.

20. The method of detecting defects in a metallic object, which consists in simultaneously passing two alternating currents in inductive relation to the object at spaced points along the object, using a component of each of said alternating currents to set up eddy current in the object and to be expended in hysteresis in the object, where the object is magnetic, in bringing each of said alternating currents into phase with its said component, in comparing said alternating currents at a point at which each of said currents is in phase with its said component and in indicating variation of one of said alternating currents with respect to the other, due to change in said component.

21. The method of detecting defects in a metallic object, which consists in simultaneously passing two alternating currents in inductive relation to the object at spaced points along the object, using a component of each of said alternating currents to set up eddy current in the object and to be expended in hysteresis in the object, where the object is magnetic, in reducing the displacement angle of each of said alternating currents with respect to its voltage by capacitative reactance in parallel with each alternating current path in inductive relation with the object, in comparing said alternating currents at a point at which each displacement angle is so reduced and in indicating variation of one of said alternating currents with respect to the other, due to the change in said component.

22. The method of detecting defects in a metallic object which consists in simultaneously passing two alternating currents in inductive relation to the object at spaced points along the object, using a component of each of said alternating currents to set up eddy current in the object and to be expended in hysteresis in the object, where the object is magnetic, in bringing each of said alternating currents into phase with its voltage by capacitative reactance in parallel with each alternating current path in inductive relation with the object, in comparing said alternating currents at a point at which each of said alternating currents is in phase with its voltage and in indicating variation of one of said alternating currents with respect to the other, due to change in said component.

23. The method of detecting defects in a metallic object, which consists in simultaneously passing two alternating currents through paths in inductive relation to the object at spaced points along the object, thereby setting up eddy current in the object, in introducing capacitative reactance into the path of each of said alternating currents to oppose inductive reactance, in comparing said alternating currents at a point at which the capacitative reactance is effective to reduce the resultant reactance in the path of each of the currents, and in indicating variation of one of said alternating currents with respect to the other due to change in eddy current.

24. The method of detecting defects in a metallic object, which consists in simultaneously passing two alternating currents through paths in inductive relation to the object at spaced points along the object, thereby setting up eddy current in the object, in introducing capacitative reactance in parallel with each of the paths in inductive relation to the object to oppose inductive reactance, in comparing said alternating currents at a point at which the capacitative reactance is effective to reduce the resultant reactance in the path of each of the currents and in indicating variation of one of said alternating currents with respect to the other, due to change in eddy current.

25. The method of increasing the sensitivity of current variation indications, obtained from an indicator in inductive relation with a set of balanced coils, whose members are respectively connected to magnet coils for inducing eddy current in an object to be tested, which consists in setting up eddy current in the object by magnet coil current passing flux transversely to the object, in reducing the phase displacement of the current passing from a magnet coil to its corresponding balanced coil with respect to that component of the current which changes proportionately with change in eddy current, and in thereby increasing the current induced in the indicator by reason of a defect in the object to be tested.

26. The method of increasing the sensitivity of current variation indications, obtained from an indicator in inductive relation with a set of balanced coils, whose members are respectively connected to magnet coils for inducing eddy current in an object to be tested, which consists in bringing the current passing from a magnet coil to its corresponding balanced coil into phase with that component of the current which changes proportionately with change in eddy current.

27. The method of increasing the sensitivity of current variation indications, obtained from an indicator in inductive relation with a set of balanced coils, whose members are respectively connected to magnet coils for inducing eddy current in an object to be tested, which consists in setting up eddy current in the object by magnet coil current passing flux transversely to the object, in reducing the phase displacement of the current passing from a magnet coil to its corresponding balanced coil with respect to the voltage and in thereby increasing the current induced in the indicator by reason of a defect in the object to be tested.

28. The method of increasing the sensitivity of current variation indications, obtained from an indicator in inductive relation with a set of balanced coils, whose members are respectively connected to magnet coils for inducing eddy current in an object to be tested, which consists in setting up eddy current in the object by magnet coil current passing flux transversely to the object, in bringing the current passing from a magnet coil to its corresponding balanced coil into phase with the voltage and in thereby increasing the current induced in the indicator by reason of a defect in the object to be tested.

29. The method of increasing the sensitivity of current variation indications, obtained from an indicator in inductive relation with a set of balanced coils, whose members are respectively connected to magnet coils for inducing eddy current in an object to be tested, which consists in setting up eddy current in the object by magnet coil current passing flux transversely to the object, in separately inserting capacitative reactance in the path of each current passing from a magnet coil to its corresponding balanced coil and in thereby increasing the current induced in the indicator by reason of a defect in the object to be tested.

30. The method of increasing the sensitivity of current variation indications, obtained from an indicator in inductive relation with a set of balanced coils, whose members are respectively connected to magnet coils for inducing eddy current in an object to be tested, which consists in separately inserting capacitative reactance in parallel with the path of each current passing from a magnet coil to its corresponding balanced coil.

31. The method of detecting defects in a metallic object, which consists in passing alternating currents through parallel paths in inductive relation to the object at a plurality of spaced points along the object, in such manner as to set up substantial eddy currents in the object at the spaced points, by flux transverse to the object, in inserting capacitative reactance in each individual path to oppose the inductive reactance of that path, in determining relative change in the alternating currents by producing an indicating current in a separate current path and in amplifying the indicating current.

32. The method of detecting defects in a metallic object, which consists in passing alternating currents through parallel paths in inductive relation to the object at a plurality of spaced points along the object in such manner as to set up substantial eddy currents in the object at the spaced points, by flux transverse to the object, in inserting capacitative reactance in each individual path in parallel with the portion of the path in inductive relation to the object, to oppose the inductive reactance of that path, and in determining relative change in the alternating currents.

33. The method of detecting defects in a metallic object, which consists in passing an alternating current through a path in inductive relation to the object, passing flux transversely through the object, in progressing the point of flux application along the object, in passing a second alternating current through a second path, in artificially reproducing in the second path the circuit characteristics of the first path, in inductively comparing the two alternating currents and in indicating variation in the first alternating current with respect to the second alternating current by setting up an indicating current.

34. The method of detecting defects in a metallic object, which consists in passing an alternating current through a path in inductive relation to the object in such manner as to set up substantial eddy current in the object by flux transverse to the object, in passing a second alternating current through a second path, in such manner as to set up substantial eddy current in the object by flux transverse to the object, in introducing capacitative reactance into the first path, in artificially reproducing in the second path the circuit characteristics of the first path, including the capacitative reactance, in comparing the two alternating currents and in indicating variation in the first alternating current with respect to the second alternating current by setting up an indicating current.

35. The method of detecting defects in a metallic object which consists in passing an alternating current through a path in inductive relation to the object, in passing a second alternating current through a second path, in introducing capacitative reactance into the first path in parallel with the portion of that path in inductive relation to the object, in artificially reproducing in the second path the circuit characteristics of the first path, including the capacitative reactance, in comparing the two alternating currents and in indicating variation in the first alternating current with respect to the second alternating current.

36. In an inductive defect detector for metallic objects, a magnet coil in inductive relation to an object to be tested, magnet poles, one on either side of the object and opposite to one another, included in the magnetic circuit of the magnet coil, whereby flux passes transversely to the object so as to set up eddy current in the object, a source of alternating current connected to the magnet coil, a current variation indicator connected to the magnet coil and to the source and responsive to change in the magnet coil current and capacity in the circuit for influencing the character of the current through the current variation indicator.

37. In an inductive defect detector for metallic objects, a magnet coil in inductive relation to an object to be tested, a source of alternating current connected to the magnet coil, a current variation indicator connected to the magnet coil and to the source and responsive to change in the magnet coil current and capacity in the circuit sufficient to bring the total current through the current variation indicator into phase with the eddy current and hysteresis component.

38. In an inductive defect detector for metallic objects, a magnet coil in inductive relation to an object to be tested, magnet poles, one on either side of the object and opposite to one another, included in the magnetic circuit of the magnet coil, whereby flux passes transversely to the object so as to set up eddy current in the object, a source of alternating current connected to the magnet coil, a current variation indicator connected to the magnet coil and to the source and responsive to change in the magnet coil current and capacity in the circuit in parallel with the magnet coil and sufficient to bring the current in the current variation indicator into phase with the voltage.

39. In an inductive defect detector for metallic objects, a magnet coil in inductive relation to an object to be tested, a source of alternating current connected to the magnet coil, a current variation indicator connected to the magnet coil and to the source and responsive to change in the magnet coil current and capacity shunting the magnet coil.

40. In an inductive defect detector for metallic objects, a magnet coil in inductive relation to an object to be tested, a source of alternating current connected to the magnet coil, a current variation indicator connected to the magnet coil and to the source and responsive to change in the magnet coil current and capacity in parallel with the magnet coil, both the capacity and the magnet coil being in series with the current variation indicator.

41. In an inductive defect detector for metallic objects, a magnet coil in inductive relation to an object to be tested, magnet poles, one on either side of the object and opposite to one another, included in the magnetic circuit of the magnet coil, whereby flux passes transversely to the object so as to set up eddy current in the object, a source of alternating current for the magnet coil, a current variation indicator in the circuit to point out changes in the magnet coil current and capacitative reactance individual to the portion of the circuit containing the magnet coil.

42. In an inductive defect detector for metallic objects, a magnet coil in inductive relation to an object to be tested, a source of alternating current connected to the magnet coil, a current variation indicator connected to the magnet coil and to the source and responsive to change in the magnet coil current and a low resistance shunt across the magnet coil.

43. In a tester for metallic objects, two magnet coils each in inductive relation to a different portion of an object to be tested, a pair of magnet poles for each magnet coil, the poles of each pair being on opposite sides of the object, whereby flux is passed transversely through the object to set up eddy currents in the object, said coils and poles being adapted to be progressed along the object, a source of alternating current connected in parallel with the magnet coils, means for comparing the currents through the magnet coils, means for improving the phase displacement of the currents compared and means for indicating the result of the comparison.

44. In a tester for metallic objects, two magnet coils each in inductive relation to a different portion of an object to be tested, a pair of magnet poles for each magnet coil, the poles of each pair being on opposite sides of the object, whereby flux is passed transversely through the object to set up eddy currents in the object, said coils and poles being adapted to be progressed along the object, a source of alternating current connected in parallel with the magnet coils, means for comparing the currents through the magnet coils, capacity in each branch of the parallel circuit and means for indicating the result of the comparsion in a separate indicating circuit.

45. In a tester for metallic objects, two magnet coils each in inductive relation to a different portion of an object to be tested, a pair of magnet poles for each magnet coil, the poles of each pair being on opposite sides of the object, whereby flux is passed transversely through the object to set up eddy currents in the object, said coils and poles being adapted to be progressed along the object, a source of alternating current connected in parallel with the magnet coils, means for comparing the currents through the magnet coils, capacity shunting each magnet coil and means for indicating the result of the comparison.

46. In a tester for metallic objects, two magnet coils each in inductive relation with a different portion of an object to be tested, a pair of magnet poles for each magnet coil, the poles of each pair being on opposite sides of the object, whereby flux is passed transversely through the object to set up eddy currents in the object, said coils and poles being adapted to be progressed along the object, a source of alternating current connected in parallel with the magnet coils, a set of balanced coils, one of which is in each parallel branch individual to one of the magnet coils, an indicator circuit in inductive relation to the balanced coils and means for improving the phase displacement of the balanced coil currents.

47. In a tester for metallic objects, two magnet coils each in inductive relation with a different portion of an object to be tested, the magnet coils being disposed at such angles with respect to the object that the flux from the magnet coils passes transversely to the object to set up eddy currents in the object, a source of alternating current connected in parallel with the magnet coils, a set of balanced coils, one of which is in each parallel branch individual to one of the magnet coils, an indicator circuit in inductive relation to the balanced coils and capacity in each parallel branch.

48. In a tester for metallic objects, two magnet coils each in inductive relation with a different portion of an object to be tested, the magnet coils being disposed at such angles with respect to the object that the flux from the magnet coils passes transversely to the object to set up eddy currents in the object, a source of alternating current connected in parallel with the magnet coils, a set of balanced coils, one of which is in each parallel branch individual to one of the magnet coils, an indicator circuit in inductive relation to the balanced coils and capacity shunting each magnet coil.

49. In a tester for metallic objects, two magnet coils each in inductive relation with a different portion of an object to be tested, the magnet coils being disposed at such angles with respect to the object that the flux from the magnet coils passes transversely to the object to set up eddy currents in the object, a source of alternating current connected in parallel with the magnet coils, a set of balanced coils, one of which is in each parallel branch individual to one of the magnet coils, an indicator circuit in inductive relation to the balanced coils, means for adjusting the impedance of one parallel branch with respect to the other and means for improving the phase displacement of the balanced coil currents.

50. In a tester for metallic objects, two magnet coils having cores spanning different portions of an object to be tested in close proximity to the object to set up eddy currents in the object by flux transverse to the object, a source of alternating current connected in parallel with the magnet coils, a set of balanced coils, one of which is in each parallel branch individual to one of the magnet coils, means for improving the phase displacement of the balanced coil currents, an indicator circuit in inductive relation to the balanced coils, an amplifier in the indicator circuit and an indicator operated from the amplified current.

51. In a tester for metallic objects, a source of alternating current, two circuit branches connected in parallel to the source, the first of said branches having an artificially constructed standard impedance, a magnet coil in the second branch in inductive relation to an object to be tested, the magnet coils being disposed at such angles with respect to the object that the flux from the magnet coils passes transversely to the object to set up eddy currents in the object, means for comparing the currents in the two circuit branches and an electric circuit for indicating relative change in the currents.

52. In a tester for metallic objects, a source of alternating current, two circuit branches connected in parallel to the source, the first of said branches having an artificially constructed standard impedance, a magnet coil in the second branch in inductive relation to an object to be tested, the magnet coils being disposed at such angles with respect to the object that the flux from the magnet coils passes transversely to the object to set up eddy currents in the object, means for improving the phase displacement of the current in each branch, means for comparing the currents in the two branches and an electric circuit for indicating relative change in the currents.

53. In a tester for metallic objects, a source of alternating current, two circuit branches connected in parallel to the source, the first of said branches having an artificially constructed standard impedance, a magnet coil in the second branch in inductive relation to an object to be tested, the magnet coils being disposed at such angles with respect to the object that the flux from the magnet coils passes transversely to the object to set up eddy currents in the object, capacity shunting the magnet coil, means for comparing the currents in the two branches and means for indicating relative change in the currents.

54. In a tester for metallic objects, a source of alternating current, two branches connected in parallel to the source, an artificially constructed standard impedance in the first branch, a magnet coil in the second branch in inductive relation to an object to be tested, the magnet coils being disposed at such angles with respect to the object that the flux from the magnet coils passes transversely to the object to set up eddy currents in the object, a set of balanced coils, one in each branch, and an indicator circuit in inductive relation to the balanced coils for pointing out relative change in the currents through the balanced coils.

55. In a tester for metallic objects, a source of alternating current, two branches connected in parallel to the source, an artificially constructed standard impedance in the first branch, a magnet coil in the second branch in inductive relation to an object to be tested, the magnet coils being disposed at such angles with respect to the object that the flux from the magnet coils passes transversely to the object to set up eddy currents in the object, capacity shunting the magnet coil in the second branch, a set of balanced coils, one in each branch, and an indicator circuit in inductive relation to the balanced coils for pointing out relative change in the currents through the balanced coils.

56. In a tester for metallic objects, electrical means for passing fluxes through an object to be tested in different directions at spaced points along the object and thereby setting up eddy current in the object, means for relatively moving the fluxes and the object so that the same portion of the object is successively subjected to the fluxes and means for indicating variation in the electrical means due to change in eddy current.

57. In a tester for metallic objects, two magnet coils at spaced points along an object to be tested, cores in close proximity to the object and adapted to pass fluxes through the object in nonparallel directions, means for passing currents through the magnet coils and means for indicating relative variation in the currents.

58. In a tester for metallic objects, two magnet coils in inductive relation to an object to be tested at spaced points along the object, cores for the magnet coils in close proximity to the object and adapted to pass fluxes through the object in oppositely sloping directions, a source of alternating current connected to the magnet coils in parallel, a set of balanced coils, one in series with each magnet coil, and an indicator circuit in inductive relation to the balanced coils for pointing out relative change in the currents through the balanced coils.

59. The method of testing a metallic object, which consists in concurrently setting up two currents in the object in different directions and in indicating relative variation in quantities responsive to the two currents.

60. The method of testing a metallic object, which consists in simultaneously setting up two alternating currents in the object at different points and in different directions, in relatively progressing the currents with respect to the object to enable the currents to pass at different times through a given portion of the object, in instantaneously comparing quantities responsive to the alternating currents and in indicating relative variation in quantities responsive to the alternating currents.

61. The method of testing a metallic object, which consists in concurrently setting up in the object currents flowing in different directions with respect to the object, in relatively moving the object and the currents so as to subject different parts of the object successively to the currents in different directions and in simultaneously indicating electrical differences produced by the currents on account of variations in the object.

62. In a tester for metallic objects, electrical means for setting up a plurality of currents in an object simultaneously in different directions at spaced points along the object, said electrical means being relatively movable with respect to the object so that the same portion of the object is successively subjected to the currents and means for concurrently indicating relative variation in quantities responsive to said currents.

63. In a tester for metallic objects, electrical means for setting up current in the object in one direction, electrical means for setting up current in the object in a nonparallel direction, operating simultaneously with the first means, both of said electrical means being relatively movable with respect to the object, in order that a given portion of the object may be included in the path of each current at some time during the operation, means for comparing quantities responsive to said currents and means for concurrently indicating relative variation in the quantities responsive to said currents.

64. In a primary circuit of a magnetic analysis apparatus the combination comprising, two exciter coils each of which is connected in series with a condenser and in parallel with the other coil across an alternating current source.

ARTHUR E. F. BILLSTEIN.